M. S. LEVE.
DEVICE FOR MEASURING LIQUIDS.
APPLICATION FILED AUG. 6, 1918.
1,299,743.
Patented Apr. 8, 1919.
2 SHEETS—SHEET 1.
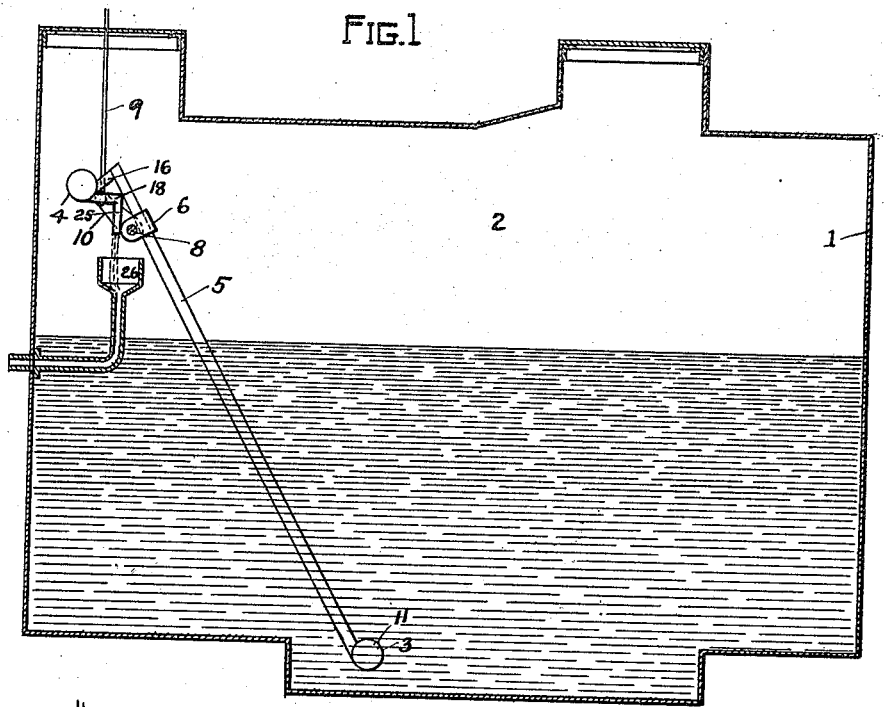
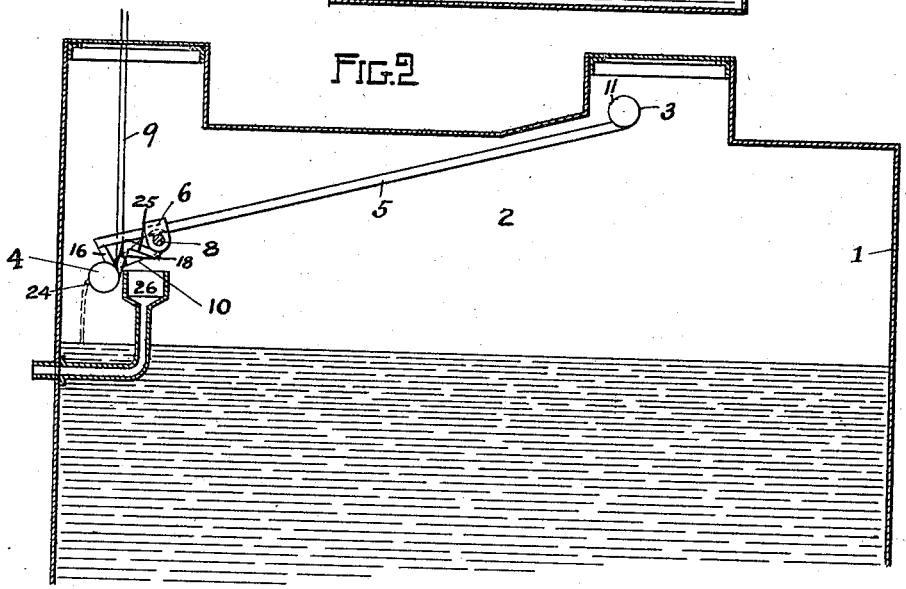
WITNESSES
INVENTOR.
Marcus S. Leve.

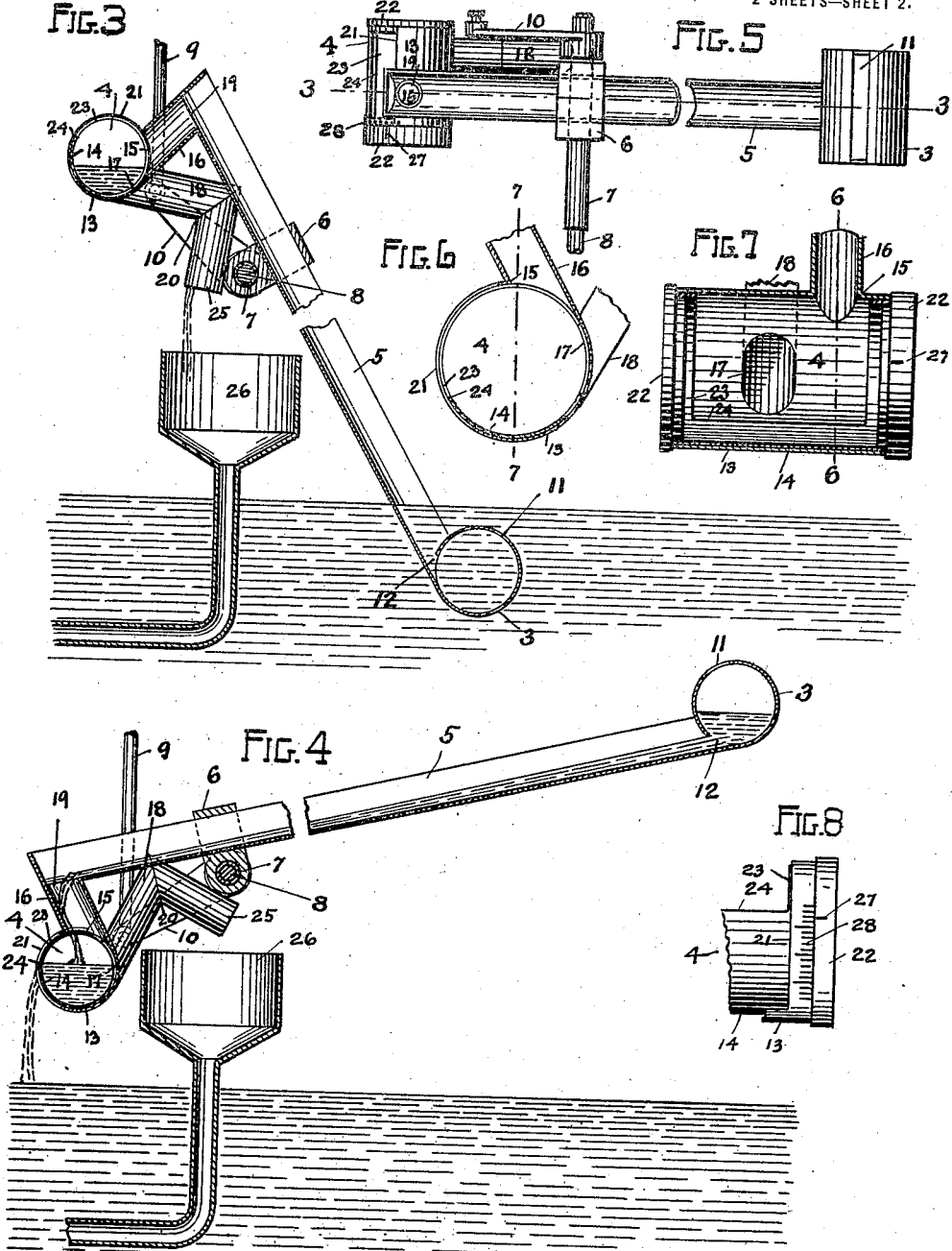

UNITED STATES PATENT OFFICE.

MARCUS S. LEVÉ, OF OAKLAND, CALIFORNIA, ASSIGNOR TO LEOPOLD BENOIT DE LAITTE, OF SAN FRANCISCO, CALIFORNIA.

DEVICE FOR MEASURING LIQUIDS.

1,299,743.  Specification of Letters Patent.  Patented Apr. 8, 1919.

Application filed August 6, 1918. Serial No. 248,570.

*To all whom it may concern:*

Be it known that I, MARCUS S. LEVÉ, a citizen of the United States, residing at Oakland, in the county of Alameda and State of California, have invented new and useful Improvements in Devices for Measuring Liquids, of which the following is a specification.

My invention relates to improvements in devices for withdrawing equal volumes of liquids from liquid containers, and the object of my invention is to provide an automatic measuring device, which is not affected in its action by the change of the surface level of the liquid in the container.

Another object is to provide a measuring device, furnished with means of adjustment, whereby the volumes to be measured may be varied through a great range.

In the accompanying drawings forming part of this specification, my invention is illustrated as applied to a gasolene tank, the device being used for withdrawing from said tank equal predetermined volumes of gasolene at a time, discharging it through a funnel leading to the outside.

Figure 1 of the drawings is a sectional elevation of a gasolene tank provided with a liquid measuring device of my invention, said device being in the position when the scoop at one end is immersed in the liquid, taking in a charge of gasolene, and the measuring cup at the other end is discharging into the funnel.

Fig. 2 is a sectional elevation of the upper portion of the tank, showing the device in the position, when the scoop is discharging the liquid into the measuring cup, the surplus of liquid overflowing over the side and returning into the liquid of the tank.

Fig. 3 is a sectional elevation of the measuring device, taken on line 3—3 of Fig. 5, the middle portion of the conduit for the liquid being broken away, and the parts being shown in the position, when the scoop is immersed in the liquid.

Fig. 4 is a sectional elevation similar to Fig. 3 with the parts shown in the position when the measuring cup is being filled.

Fig. 5 is a plan view of the measuring device.

Fig. 6 is an enlarged cross section of the measuring cup, taken on line 6—6 of Fig. 7.

Fig. 7 is a longitudinal section of the same cup, taken on line 7—7 of Fig. 6 and Fig. 8 is a detail of a portion of the measuring cup, showing the graduations on the outer shell for varying the volumes to be measured.

The gasolene tank 1 is shown to be partially filled with the liquid, the upper portion forming an air space 2 for the placing of the measuring device.

The said measuring device consists of a scoop 3, a measuring cup 4, and a conduit 5 uniting said scoop and said cup.

A pivoting block 6 provided with a tube 7 is secured to the conduit 5 close to the measuring cup, and a shaft 8 is made to fit the inside of said tube.

The device is placed within the tank 1, and is pivotally mounted upon the horizontal shaft 8, which is supported from the side walls of the tank at some distance above the surface of the liquid.

A rod 9 engaging the end of an arm 10, which is secured to the tube 7, is used for imparting an oscillatory movement to the device around the shaft 8, bringing it at one time to the position shown in Fig. 1, where the scoop 3 is at the lowest position, being immersed in the liquid, and at another time bringing it to the position shown in Fig. 2, where the scoop 3 is at its highest position and at an elevation above the measuring cup 4.

The rod 9 may be actuated by hand, but usually it is connected to a crank or to an arm, (not shown) provided upon the machine with which the measuring device is intended to work in conjunction.

The scoop 3 is preferably formed of a cylindrical shape, and is secured to the conduit 5 with its axis parallel to the tube 7, as shown in the details of Figs. 3, 4 and 5.

The scoop 3 is provided at the top with a port or opening 11, and with another port 12 leading to the conduit 5.

When the scoop 3 enters the liquid, while moving to the position shown in Figs. 1 and 3, it becomes filled through the opening 12, the air from the interior escaping through the opening 11 at the top; and when brought to the position shown in Figs. 2 and 4, the liquid is discharged from the scoop 3 through the opening 12 into the conduit 5, and is carried by gravity along said conduit toward the measuring cup 4.

The measuring cup is formed of the outer cylindrical shell 13, which is open at both ends, and is fitted with an inner tube 14 closed at the ends of the heads 22.

The outer shell 13 is secured at the end of the conduit 5 with its axis parallel to the tube 7, and is provided with an inlet opening 15 connecting by means of the inlet tube 16 with the discharge end of the conduit 5; a discharge opening 17 furnished with a bent discharge tube 18 is placed at one side, and an overflow opening 21 is placed at the opposite side.

The said inlet and outlet openings 15 and 17 and the said inlet and outlet tubes 16 and 18 are so arranged and placed with relation to the conduit 5, as to cause the inlet end 19 of the tube 16 to remain all the time at a higher elevation above the inlet opening 15, while the measuring device is being oscillated back and forth; and to cause the bend 20 of the discharge tube 18 to alter its elevation in relation to the discharge opening 17, bringing said bend 20 below the elevation of said opening 17, when the device is in the position of Figs. 1 and 3, and above said elevation, when in the position shown in Figs. 2 and 4.

The shell 14 fitting the interior of the outer shell 13 is provided with a broad overflow opening 23, corresponding to the overflow opening 21 of the outer shell.

The following is the mode of operation of my improved device:

Beginning with the position of parts as shown in Fig. 1 and in detail of Fig. 3, where the scoop 3 is shown immersed and full of liquid; the device which is connected by the rod 9 to any reciprocating part of a machine (not shown) with which it is to work in conjunction, begins to oscillate; the scoop 3 moving upward emerges above the surface of the liquid, swinging toward the position shown in Figs. 2 and 4. During all this upward motion the liquid from the interior of the scoop is passing through the port 12, and entering the conduit 5, it moves along said conduit toward the measuring cup 13 and reaches the end of the conduit about the time, when said conduit comes to the horizontal position. Then it begins to pass through the tube 16 into the measuring cup and finishes discharging into the cup before the scoop reaches the apex of the upward stroke.

The liquid discharged from the conduit 5 fills the measuring cup, the surplus overflowing over the lower edge 24 of the overflow opening 23, in the inner shell 14, as shown in Figs. 2 and 4, leaving inside the cup a quantity of liquid the volume of which is determined by the contents of the measuring cup up to the level of the overflow edge 24 at the time, when said edge is in the lowest position, the device being at the apex of the stroke. The volume thus becomes determined under the most favorable conditions, when the cup is at rest at the end of the stroke.

On the return stroke the measured volume of liquid becomes discharged through the discharge opening 17, and through the tube 18 into the bent portion 25, which bent portion serves to direct the liquid into the funnel 26 to be discharged outside of the tank; the scoop at the same time enters again the liquid in the tank and receives another charge.

The volume to be measured may be varied by raising or lowering the overflow edge 24 of the inner shell 14, which is accomplished by turning said inner shell within the outer shell 13 in one or in the opposite direction.

A mark or pointer 27 may be provided on one of the heads 22 of the inner shell, and a number of graduation marks 28, representing volumes measured, may be placed upon the outer shell 13, in order to facilitate the adjustment of the measuring cup to the volume required.

The scoop 3 is formed of a volume above the largest capacity of the measuring cup, in order to deliver sufficient liquid to fill said cup, and to leave a surplus for an overflow.

The variation of level of the liquid in the tank has no effect upon the accuracy of the working of the measuring cup, since a varied volume of liquid delivered to said cup will only cause a variation in the volume of liquid overflowing over the edge 24 back into the tank.

The several functions performed by the device are well distributed between the forward and return strokes of the oscillation, in order to give ample time for performing said functions, when the device is intended to be operated at a considerable speed.

Having thus described my invention, what I claim as new, and desire to secure by Letters Patent, is:

1. In a device of the character described the combination of a conduit for liquids pivotally mounted upon a shaft, a scoop or spoon carried at one end of said conduit adapted to discharge liquid into said conduit, a measuring device adapted to receive the liquid from said conduit, and means for imparting an oscillating motion to said conduit.

2. In a device of the character described the combination of a conduit pivotally mounted upon a shaft, means adapted to impart an oscillating motion to said conduit, a scoop carried upon one end of the conduit, a measuring cup carried upon the other end, an outlet opening provided at one side of said cup, an overflow at the other side, and an inlet pipe placed between said inlet opening and said overflow.

3. In a device of the character described a measuring cup pivotally mounted and adapted to receive an oscillating motion, an inlet opening provided in said cup, means adapted to deliver liquid to said cup, an overflow opening provided in the side of the cup at one side of said inlet opening, and an outlet opening provided at the other side.

4. In a device of the character described a measuring cup pivotally mounted upon a shaft, means adapted to deliver liquid into said cup, an overflow opening provided at one side of the cup, an outlet opening provided at the opposite side, and means for imparting an oscillating motion to said cup.

5. In a device of the character described a measuring cup pivotally mounted comprising an outer shell, and an inner shell fitting the inside of said outer shell, means for delivering liquid into said cup, an outlet opening provided at one side of the outer shell, an overflow opening at the other side of said shell, an overflow opening in the inner shell, and means adapted to impart an oscillatory motion to said cup.

6. In a device of the character described a measuring cup pivotally mounted upon a shaft comprising an outer cylindrical shell, and an inner cylindrical shell fitted to turn inside the outer shell, means for delivering liquid into said cup, an outlet opening provided at one side of the outer shell, an overflow opening at the opposite side of the same shell, an overflow opening provided in the inner shell, graduation marks provided upon one of said shells, a pointer provided upon the other shell adapted to register the mutual relative position of said shells, and means for imparting an oscillatory motion to said cup.

7. A device of the character described comprising a measuring cup pivotally mounted upon a horizontal axis, means adapted to oscillate said cup about said axis, an inlet pipe secured to said cup at such an angle as to have a downward slope toward said cup at the two extremes of the forward and return strokes of the oscillations, an outlet tube secured to said cup at such an angle as to slope downward toward the cup at the end of one stroke and away from the cup at the end of the other stroke of the oscillation, and an overflow opening provided in the side opposite said overflow opening.

8. A device of the character described comprising a measuring cup pivotally mounted upon a horizontal axis, means adapted to oscillate said cup about said axis, an overflow opening adapted to discharge the liquid from the cup during the stroke in one direction, an outlet opening adapted to discharge the liquid during the stroke in the opposite direction, and means for delivering liquid into said cup.

MARCUS S. LEVÉ.

Witnesses:
A. NEUMAN,
H. HALLER.

Copies of this patent may be obtained for five cents each, by addressing the "Commissioner of Patents, Washington, D. C."